United States Patent [19]
Doonan et al.

[11] Patent Number: 5,147,666
[45] Date of Patent: * Sep. 15, 1992

[54] REMOVAL OF MALIC ACID FROM COFFEE BY FERMENTATION

[75] Inventors: Barbara B. Doonan, Mt. Vernon; Geoffrey H. Bertkau; Dennis F. Hayes, both of Brewster; Frank Sabella, Brooklyn, all of N.Y.; Ronald H. Skiff, Whippany, N.J.

[73] Assignee: Kraft General Foods, Inc., Northfield, Ill.

[*] Notice: The portion of the term of this patent subsequent to Dec. 11, 2007 has been disclaimed.

[21] Appl. No.: 665,124

[22] Filed: Mar. 6, 1991

Related U.S. Application Data

[63] Continuation-in-part of Ser. No. 625,514, Dec. 11, 1991, abandoned, which is a continuation-in-part of Ser. No. 348,627, May 8, 1989, Pat. No. 4,976,983.

[51] Int. Cl.$^5$ .............................. A23F 5/00; A23L 1/36
[52] U.S. Cl. ...................................... 426/45; 426/44; 426/594; 426/595; 426/629; 426/655
[58] Field of Search .................... 426/44, 45, 594, 595, 426/629, 655

[56] References Cited

U.S. PATENT DOCUMENTS

| | | | |
|---|---|---|---|
| 4,380,552 | 4/1983 | Gestrelius et al. | 426/52 |
| 4,562,077 | 12/1985 | King | 426/13 |
| 4,976,983 | 12/1990 | Hiosh et al. | 426/594 |

Primary Examiner—Joseph Golian
Assistant Examiner—Evan Federman
Attorney, Agent, or Firm—Thomas A. Marcoux; Linn I. Grim; Thomas R. Savoie

[57] ABSTRACT

Malic acid is removed from coffee to provide a coffee product which will evoke a decreased gastric acid response after ingestion. Malic acid is removed by malolactic fermentation of an aqueous coffee extract, which may be a green or brown extract. A malic acid-lean extract can be used to extract malic acid from coffee solids to produce demalated coffee solids. Demalation is preferably accomplished without removing excessive amounts of chlorogenic acid. Coffee products in accordance with the invention are preferably decaffeinated.

22 Claims, 2 Drawing Sheets

REMOVAL OF MALIC ACID FROM COFFEE BY FERMENTATION

CROSS REFERENCE TO RELATED APPLICATION

This application is a continuation-in-part of co-pending application Ser. No 07/625,514, filed Dec. 11, 1991 now abandoned, which was a continuation-in-part of Ser. No. 07/348,627, filed May 8, 1989, now U.S. Pat. No. 4,976,983, the disclosure of which is incorporated by reference herein.

TECHNICAL FIELD

The present invention relates to coffee processing, specifically to the removal of malic acid from coffee to provide a coffee product which will evoke a decreased gastric acid response after ingestion.

BACKGROUND OF THE INVENTION

As is more fully explained in co-pending application Ser. No. 07/348,627, normal food intake which is known to lead to gastric acid secretion because of stomach distension and because of the action of only a few commonly ingested food constituents such as caffeine, calcium ions, alcohol, and the digestion products of protein.

Early attempts in the food art to produce a "stomach friendly" coffee, that is a coffee which will produce less or no heartburn in susceptible individuals, centered upon the deacidification of coffee such as by chemically neutralizing the acids present in coffee by the addition of a food-grade alkaline agent.

Farr and Horman (U.S. Pat. Nos. 4,160,042 and 4,204,004) teach a method of reducing the caffeine and/or chlorogenic acid content of coffee by treatment with particles of carob pods which absorb the caffeine and chlorogenic acid. Magnolato (U.S. Pat. No. 4,278,696) teaches a process for deacidifying a coffee extract by contacting it with chitosan in divided form and recovering the resultant deacidified extract. This patent stresses the importance of the removal of chlorogenic acid since it is the predominant acid found in coffee. However, other acids including malic acid are also reduced by the treatment. Another process, described in U.S. Pat. No. 4,317,841 to Brambella and Horman, teaches reduction in the acidity of a coffee extract by electrodialysis. The non-cathodic extract is collected, contacted with subdivided chitosan and, after removal of the chitosan, is mixed with at least a part of cathodic extract to provide a deacidified coffee extract.

Published Patent Application DE 3,239,219, published Apr. 26, 1984, discloses contacting an aqueous extract of green coffee beans with an anion-exchange resin, the resin having been loaded by adsorption with at least one nonacidic coffee extract constituent in order to exchange the acids present in the aqueous extract to produce a reduced chlorogenic acid green coffee. The object is to produce a coffee product which would reduce irritation of stomach mucosa and not cause stomach acidity.

PCT International Publication Number WO 87/04598 having a publication date of Aug. 13, 1987 teaches a coffee product with an increased chlorogenic acid content. This elevated chlorogenic acid level is said to improve the digestibility of coffee by reducing human acid secretion. The physiology studies reported in the patent application were performed on human male and female subjects. However, the poor methodology utilized in the studies including the lack of proper scientific controls render the results questionable at best.

Co-pending application Ser. No. 07/348,627 discloses production of a stomach friendly coffee by selectively removing malic acid and without sacrificing the large percentage yield loss and flavor penalty which results from the removal of a majority of chlorogenic acid as taught by prior art references.

It is an object of the present invention to provide a method for removing malic acid from coffee. It is a further object of the invention to provide a method of removing malic acid from coffee which method includes malolactic fermentation of an aqueous coffee extract.

BRIEF SUMMARY OF THE INVENTION

The foregoing and other objects which will be apparent to those of ordinary skill in the art are achieved in accordance with the invention by providing a process for removing malic acid from a coffee product comprising subjecting a malic acid-containing aqueous coffee extract to malolactic fermentation, and recovering a malic acid-lean aqueous coffee extract having a reduced malic acid content.

DESCRIPTION OF PREFERRED EMBODIMENTS

Figure 1:
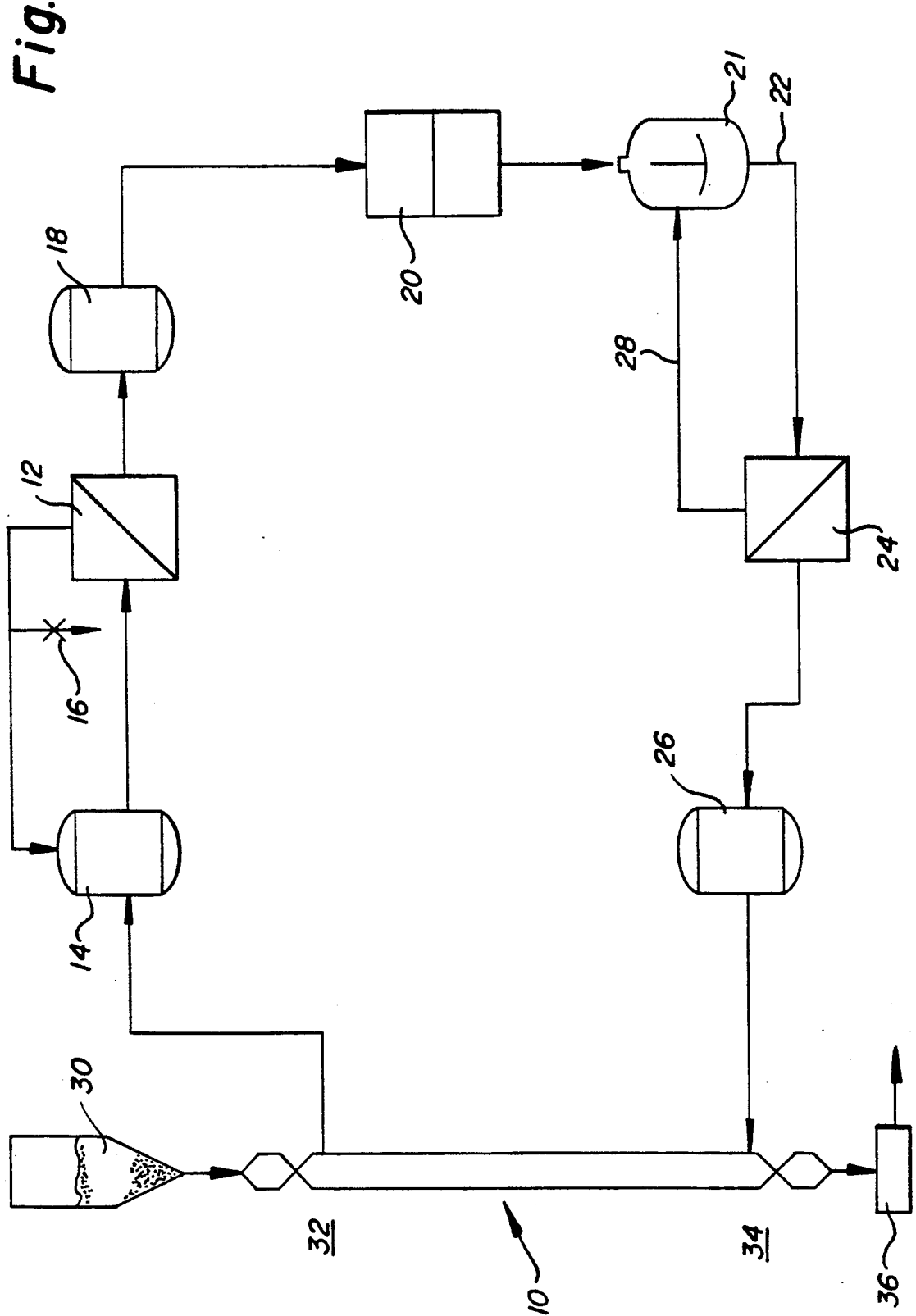
Figure 2:
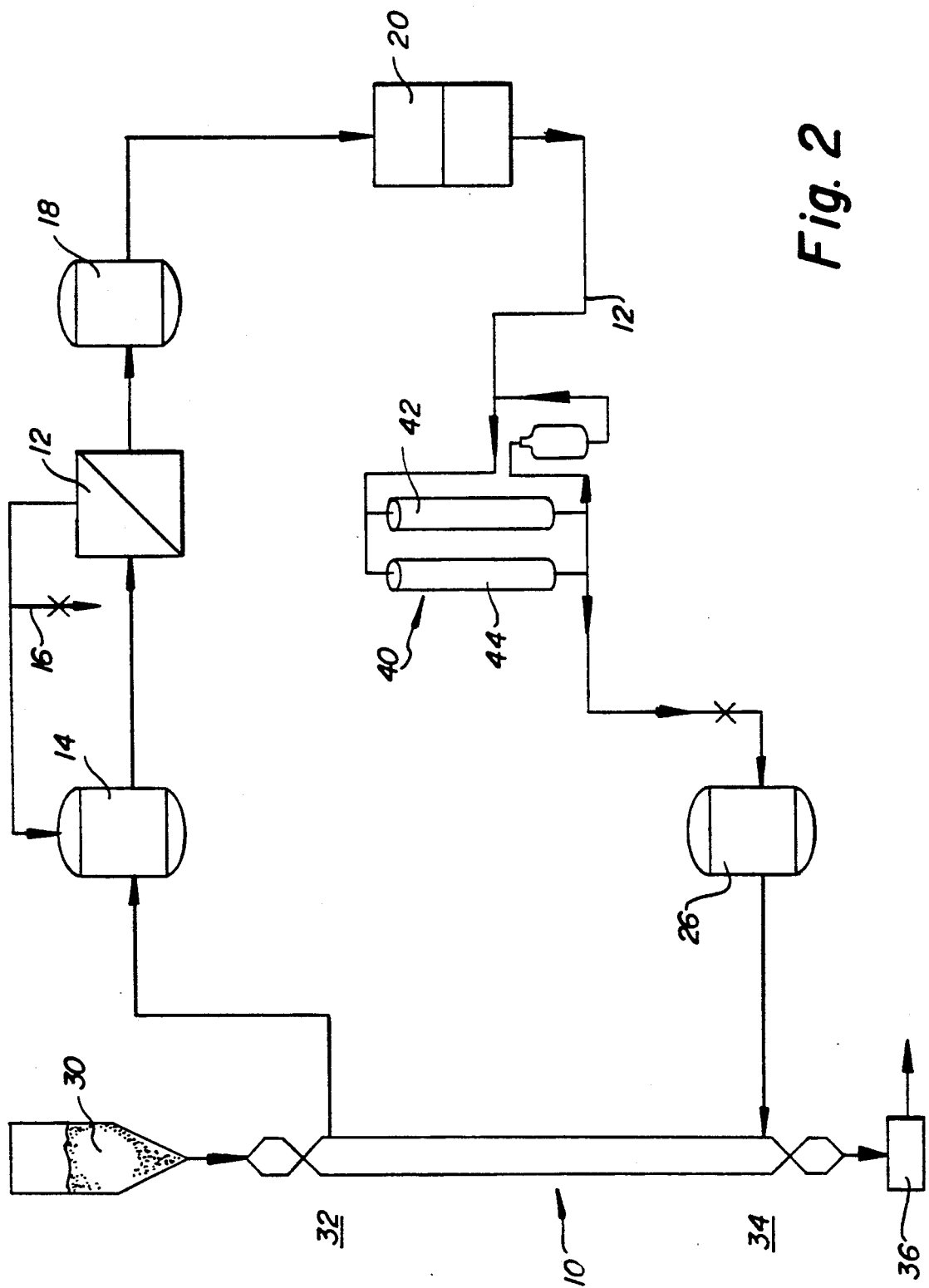

There follows a detailed description of preferred embodiments of the invention, including the best mode of carrying out the invention, including the drawings in which:

FIG. 1 is a diagrammatic flowsheet of a first embodiment of the invention in which malic acid is removed from an aqueous coffee extract by batch fermentation and in which the malic acid-lean extract is used to remove malic acid from coffee solids; and FIG. 2 is a diagrammatic flowsheet of a second embodiment of the invention which is like that of FIG. 1 except that continuous fermentation utilizing an immobilized cell bioreactor is employed in lieu of batch fermentation.

In accordance with the invention, malic acid is removed from an aqueous extract of coffee solids by subjecting the extract to malolactic fermentation. A malic acid-lean aqueous coffee extract, having a reduced malic acid content, is recovered. The malic acid content of the extract is readily reduced by malolactic fermentation. It is preferred to reduce the malic acid content of the extract by at least 65%, more preferably by at least 80%. Fermentation may be carried to completion, in which case the extract will be essentially free of malic acid.

The aqueous extract can be either a green extract, i.e. an extract of green coffee solids, or a brown extract, i.e. an extract of roasted coffee solids, and the coffee solids can be whole beans or ground.

The extract is preferably a green extract made up of soluble green coffee solids. The demalated green extract can be used to extract malic acid from green coffee solids, preferably whole green coffee beans, to produce a demalated green coffee solids product. The malic acid-containing extract resulting from the extraction step can be recycled to the malolactic fermentation step and the resulting malic acid-lean extract can be recycled to the extraction-step to extract malic acid from green coffee solids. In this way the green extract is repeatedly recycled through the fermentation and extraction steps while green coffee solids are being subjected to extraction of malic acid.

Where the extract is a brown extract, the demalated extract can be a coffee product such as a liquid coffee product having a reduced malic acid content, or it can be processed further to provide a coffee product such as a liquid or soluble coffee product having a reduced malic acid content. Alternatively, the malic acid-lean brown extract can be used to extract malic acid from roast coffee solids to produce a demalated roast coffee solids product. Malic acid extracted from the coffee solids introduces malic acid into the brown extract, and the brown extract, now containing malic acid, can be resubjected to malolactic fermentation to reduce its malic acid content. Thus, the brown extract can be repeatedly recycled through the fermentation and extraction steps while roasted coffee solids are being subjected to extraction of malic acid.

Malolactic fermentation in accordance with the invention may be batch or continuous and is preferably continuous utilizing an immobilized cell bioreactor for several reasons which will be mentioned below. Preferred conditions of batch fermentation are as follows:

| | Preferred | More Preferred | Optimum |
|---|---|---|---|
| pH | 3–6 | 3.5–5.8 | 4.5–5.2 |
| Temperature | 16–37° C. | 21–32° C. | 28–30° C. |
| Aeration (% Dissolved Oxygen, 100% = Saturated) | 0–50% DO | 0–25% DO | 15% DO |
| Total Coffee Solids (Wt %, based on wt. of extract) | 5–30% | 20–30% | 25% |
| Microorganism | Lactic acid bacteria | Bacteria of the genera Streptoccoccus, Leuconostoc, Pediococcus, and Lactobacillus Examples are: Strep. lactis diacetylactis Leuconostoc oenos Leuconostoc cremoris Lactobacillus acidophilus Lactobacillus plantarum Lactobacillus brevis nysae | L. oenos Lactobacillus plantarum |
| Fermentation time (For essentially complete fermentation) | 1–72 hrs. | 2–36 hrs. | 2–24 hrs. |
| Bacteria concentration (Colony Forming Units/ml) | $10^6$–$10^9$ | $10^8$–$10^9$ | $10^9$ |

Preferred conditions of continuous malolactic fermentation utilizing an immobilized cell bioreactor are the same as above, except as follows:

| | Preferred | More Preferred | Optimum |
|---|---|---|---|
| Aeration | 0–50% DO | 0–25% DO | 0–15% DO |
| (% dissolved oxygen; 100% = saturated) | | | |
| Fermentation Time (for essentially complete fermentation) | <30 mins. | <20 mins. | 4–15 mins. |
| Microorganism (bacterial cells/ square inch of support) | $10^9$–$10^{12}$ | $10^{10}$–$5 \times 10^{11}$ | $10^{11}$–$5 \times 10^{11}$ |
| Extract flow rate (ml/square foot of support per hour) | 50–1000 | 75–600 | 200–400 |

During fermentation, sugars present in the aqueous extract are also lost and lactic acid is consequently produced. Significant sugar losses and consequent lactic acid production occur during batch fermentation. However, sugar losses are substantially reduced during continuous fermentation. When a sugar-depleted demalated extract is used to extract malic acid from coffee solids in accordance with the invention, sucrose and other sugars tend to be extracted during contact with green coffee beans. These sugars are important to flavor development during roasting of the green coffee. Thus, sucrose and other sugars may be added, for example, to the malic acid lean green extract used to contact and remove malic acid from green coffee solids. Since sugars are added to the malic acid lean extract, they tend not to be removed from the coffee during the malic acid removal phase. In those cases where it is necessary or desirable, sugar may be added to the malic acid lean green extract in a quantity sufficient to prevent substantial loss of sugar from the green coffee solids during contacting thereof with the malic acid lean coffee extract.

While sugar metabolism is significant during batch fermentation, less metabolism occurs during continuous fermentation. Therefore, it is preferred to effect fermentation continuously. Continuous fermentation also has the advantages of avoiding the step of separating cells from the demalated extract after fermentation, and essentially no loss of coffee solids. In addition, initial equipment and maintenance costs are low, conventional biosupports, which can be cleaned and re-used, may be employed, and the bioreactor is stable for long periods of time.

As disclosed in co-pending application Ser. No. 07/348,627, the malic acid content of coffees varies considerably. For example, green Robusta coffees tend to have generally lower malic acid content of, typically, 0.12 to 0.36% on a dry weight basis. Green Arabica coffees, on the other hand, have a generally higher malic acid content of, typically, 0.38 to 0.67% on a dry weight basis. Roast and ground Robusta coffees typically have a malic acid content of about 0.05 to 0.2% dry weight basis and roast and ground Arabica coffees typically have a malic acid content of about 0.3 to 0.5% dry weight basis. A typical green extract of a Robusta coffee would have a malic acid content of about 0.1 to 0.3% by weight based on the weight of total coffee solids in the extract and a green extract of a Arabica coffee would typically have a malic acid content of about 0.3 to 0.5% by weight based on the weight of total coffee solids in the extract. The malic acid content of typical brown extracts of Robusta and Arabica coffees, respectively, would be 0.1 to 0.9% and 0.35 to 1.6% by weight based on the weight of the total coffee solids in the extract at solids yields of 25% to 60% from the roasted coffee.

During fermentation of the malic acid-containing coffee extracts, it is preferred to metabolize at least 55% of the malic acid content of the extract, more preferably at least 80%, and optimally at least 85%. The degree of demalation can vary, especially if the demalated product is later admixed with a coffee product naturally low in malic acid, e.g. Robusta coffee. Complete fermentation of the malic acid, such that the extract is essentially free of malic acid, is readily achieved, but more sugar will also be metabolized. These losses are minimized by employing continuous fermentation.

During extraction of malic acid-containing coffee solids, it is preferred to extract a majority of the malic acid content of the coffee solids, preferably at least 55%, and more preferably at least 80%. It is a distinct advantage of the invention and a preferred aspect of the present invention that the use of the malic acid lean extract produced by malolactic fermentation in accordance with the invention to extract malic acid from coffee solids, is highly selective for malic acid. It is thus possible, and preferred, to preserve chlorogenic acid and other acids while extracting a significant quantity of malic acid. More preferably, a majority of the malic acid is extracted while at least 55% of the chlorogenic acid content of the coffee solids is retained. Even more preferably, at least 55% of the malic acid content is extracted while at least 75% of the chlorogenic acid is retained. Demalated roasted coffee solids in accordance with the invention preferably contains less than about 0.085% malic acid on a dry weight basis and less than half of the malic acid content that the roasted product would have in the absence of demalation.

Since caffeine is a known stimulant of the production of digestive acid in the stomach, it is preferred that the coffee solids are decaffeinated. Preferably, at least 75%, more preferably at least 90%, and still more preferably at least 95% of the caffeine content of the caffeine is removed by any conventional decaffeination technique. Decaffeination is preferably effected prior to extraction of malic acid in accordance with the invention and is preferably effected on green coffee solids.

EXAMPLE 1

With reference to FIG. 1, 900 pounds of aqueous green coffee extract obtained by extraction of whole green beans of decaffeinated Centrals coffee in pulse column 10 is clarified via a 0.2 μm crossflow ceramic microfiltration unit 12 operated at 100° F. and an average pressure of 80 psi. The extract contains 20% total coffee solids ("TS"), 0.05% insolubles, 0.144% malic (as is) and has a pH of 4.91. One hundred and seventy pounds of retentate is returned to vessel 14 used to collect green extract from the pulse column and to feed green extract to clarifier 12. A portion of the retentate is periodically discharged at 16 to remove insolubles from the system. Seven hundred and thirty pounds of clarified green extract containing 0.144% malic acid (as is) and free of insolubles, is collected as permeate in vessel 18. The clarified green extract is then fed to sterilizing unit 20, a cold sterilizing unit comprising two filter cartridges in series. Other types of sterilization units can be employed, such as a high temperature, short time unit. Sterilizing filter unit 20 consists of two filter cartridges in series. The first filter is a 0.3 μm cellulose ester pre-filter. The second filter is a 0.22 μm dead-end final filter made of a hydrophilic polyvinylidene difluoride. Extract is fed to the filters at 80° F. at a rate of 55 lb/minute. Extract leaving the final filter is considered sterile and free of microorganisms; this is determined via a culture plate which is incubated at 37° C. for 72 hours. Sterile extract leaving the final filter contains 17.9% total solids (TS) and passes through a chiller (not shown) to maintain 80° F., then is directly fed to a 750 liter fermentor 21. Prior to use, the pre-filter is hot water sanitized, and the final filter, fermentor and piping are steam sterilized.

Initially fermentor 21 contains 235 lbs. of green extract containing about 2.3 E+06 CFU/ml (colony forming units/ml) of *L. oenos*, 24.4% TS, and 0.076% (as is) malic acid. All percentages in this example and throughout the application are on a weight/weight basis unless otherwise state. The 730 lbs. of malic acid rich green extract from the filter sterilization unit is added to the fermentor. The malic acid rich green extract in the fermentor is then inoculated with 120 lbs. of green extract with an *L. oenos* cell count of 6.0 E+06 CFU/ml. and a malic acid level of 0.013% (as is). At this point, time zero, the fermentor contains 0.113% malic acid (as is) and 6.5 E+06 CFU/ml *L. oenos*. The fermentor is maintained at 87° F., 3 psi, agitated at 100 rpm and is aerated with 25 liters/min of sterile air. After 48 hours, the malic level of the extract in the fermentor is reduced to 0%, the cell count increases to 8.8 E+08 CFU/ml, and the pH has decreased to 4.62 from 4.85.

In a sterile fashion, 1,085 lbs. of malic lean, cell rich green extract is passed via conduit 22 through a presterilized 0.2 μm ceramic crossflow microfiltration unit 24 to separate the *L. oenos* cells from the malic acid lean green extract. The filtration unit is operated at 80° F. and an average pressure of 60 psi. Eight hundred and sixty-five pounds of malic acid and cell lean green extract is collected as permeate in vessel 26. The permeate contains 0% malic acid, 18.4% TS, and 5.1 E+03 CFU/ml *L. oenos*. This extract is stored in vessel 26 at 160° F., waiting to be passed through a bed of fresh malic acid rich green beans in pulse column 10. One hundred and forty-five pounds of the cell rich green extract (retentate from microfiltration unit 24) is returned via conduit 28 to the fermentor 21 to await the addition of a fresh batch of sterilized malic rich green extract.

The retentate returned to the fermentor contains 6.8 E+09 CFU/ml *L. oenos* and 23.6% TS. This extract is maintained at 87° F.

One hundred and thirty-four pounds of decaffeinated Central beans (as is @11.5% H₂O) with an initial malic acid content of 0.486%, dry basis ("db") are demalated in pulse column 10 with the malic lean green extract held in vessel 26 containing 0% malic acid and 18.4% TS. Malic acid rich beans 30 at 40% H₂O are fed semi-continuously to the top of the green bean extractor. The green bean extractor is an atmospheric pulse column which pulses malic acid rich beans in the top 32 and discharges malic acid lean beans from the bottom 34 every 30 minutes. Malic acid lean green extract at 177° F. is fed countercurrently in a one pass fashion from vessel 26 across the bean bed to extract the malic acid at an extract to bean ratio per pulse of 6.3:1. The beans have a residence time in the extractor of 6.5 hrs. The beans leaving the extractor are at 54% H₂O and contain 0.006% malic acid (db). The green extract leaving the top 32 of the extractor is rich in malic acid at 0.09% (as is) and has a 19.8% TS, 0.08% insoluble content, and a pH of 4.67.

The malic lean beans are then dried from 54% to 11% H$_2$O in a fluidized bed air dryer 36 at 180° F.

The green bean extractor pulse column 10 is 4 inches I.D., by 33 feet in height. Green extract is passed across the bean bed at a superficial velocity of 0.2 ft./min.

The malic rich green extract (880 lbs.) leaving the extractor is collected in vessel 14, held at 160° F. and awaits clarification, sterilization and addition to fermentor 21.

The chlorogenic acid content of the demalated green coffee beans is not significantly reduced.

EXAMPLE 2

The malic acid rich green extract (880 lbs.) removed from the top of column 10 in Example 1 is collected in vessel 14 and contains 0.09% malic acid (as is) 19.8% to TS, 0.08% insolubles, and has a pH of 4.67. The extract is clarified at 12 in the 0.2 μm crossflow ceramic microfiltration unit operated at 169° F. and at an average pressure of 80 psi. Seven hundred and forty-three lbs. of clarified (insoluble free) green extract is collected at 18 as permeate. The permeate contains 0.09% malic acid (as is) and 16.4% total solids. One hundred and thirty-nine pounds of insoluble rich extract (retentate) is not used further in this example. The clarified extract is then fed to a series of cartridge filters as in Example 1 to sterilize the extract.

Extract is fed to the filters at 110° F. at a rate of 22 lb./minute. Extract leaving the final filter is considered sterile and free of microorganisms; this is determined via a culture plate which is incubated at 37° C. for 72 hours. Sterile extract leaving the final filter contains 16.2% TS and passes through a chiller (not shown) to maintain 80° F., then is directly fed to the 750 L fermentor 21. Prior to use, the pre-filter is hot water sanitized, and the final filter, fermentor and piping is steam sterilized.

Initially, fermentor 21 contained 145 lbs. of green extract containing ca. 6.2 E+09 CFU/ml (colony forming units/ml) of L. oenos, 23.0% TS, and 0.0% malic acid. The 743 lbs. of malic acid rich green extract from the filter sterilization unit is added to the fermentor. At this point, time zero, the fermentor contains 0.07% malic (as is), 18.0% TS, a pH of 4.62, and 1.2 E+09 CFU/ml L. oenos. The fermentor is maintained at 87° F., 3 psi, agitated at 100 rpm and is aerated with 25 L/min. of sterile air. After six hours, the malic acid level of the extract in the fermentor is reduced to 0%, the cell count is increased to 1.5 E+09 CFU/ml, and the pH is decreased to 4.40.

In a sterile fashion, 888 lbs. of malic acid lean, cell rich green extract is passed through the 0.2 μm ceramic crossflow microfiltration unit 24 to separate the L. oenos cells from the malic lean green extract. The unit is operated at 82° F. and an average pressure of 80 psi. Seven hundred and forty-nine lbs. of malic acid and cell lean green extract is collected as permeate. The permeate contains 0% malic acid, 15.4% TS, and 7.7 E+03 CFU/ml. L. oenos. This extract is then stored in vessel 26 at 160° F., waiting to be passed through a bed of fresh malic acid rich green beans in column 10. One hundred and thirty-nine lbs. of the cell rich green extract (retentate from microfiltration unit 24) contains 6.2 E+09 CFU/ml L. oenos, 23.0% TS. This extract is not used further in this example.

One hundred and ten pounds of decaffeinated Central beans (as is @11.5% H$_2$O) with an initial malic acid content of 0.486%, db are demalated with the above mentioned malic lean green extract containing 0% malic acid and 15.4% TS. Malic acid rich beans at 40% H$_2$O are fed semi-continuously to the top 32 of the green bean extractor. The green bean extractor is an atmospheric pulse column as described in Example 1 which pulses malic rich beans in the top and discharges malic acid lean beans from the bottom every 30 minutes. Malic acid lean green extract at 178° F. is fed countercurrently in a one pass fashion across the bean bed to extract the malic acid at a superficial velocity of 0.23 ft./min and at a 6.8/1 extract to bean ratio per pulse. The beans have a residence time in the extractor of 6.5 hrs. The beans leaving the extractor are at 56% H$_2$O and contain 0.00% malic acid (db). The green extract leaving the top of the extractor is rich in malic acid at 0.091% (as is) and at a 19.0% TS level.

The malic acid lean beans are then dried from 56% to 11% H$_2$O in a fluidized bed air dryer at 180° F.

The malic acid rich green extract leaving the extractor (880 lbs.) is collected in vessel 14. The chlorogenic acid content of the demalated green coffee beans is not significantly reduced as compared to its initial content.

EXAMPLE 3

The green demalated coffee produced in Example 1 is roasted to a 50° L. roast color. Upon roasting, the demalated product contains 0.024% malic acid and 0.039% caffeine on a dry weight basis. The product is judged to be typical of a roast and ground decaffeinated Centrals product and slightly more sour than its non-demalated, decaffeinated control.

The same decaffeinated Centrals green beans demalated in Example 1 are roasted, without demalation, to a 50° L. roast color. Upon roasting, the central beans contain 0.32% malic acid and 0.0285% caffeine on a dry weight basis. Thus, the malic acid content of the roasted and ground bean is reduced by over 90%.

EXAMPLE 4

Malic acid in a green coffee extract (GCE) is metabolized by *Lactobacillus plantarum* during five consecutive one liter fermentations.

One liter of Arabica green coffee extract (25I% solids, pH 5.78) is centrifuged to remove the insolubles and then sterilized. After cooling, it is inoculated with *Lactobacillus plantarum* (72 hr. culture in GCE) such that the initial cell population is $3.2 \times 10^8$ colony-forming units (CFU) per ml. The malolactic fermentation is conducted at 30° C., with agitation, and 0.25 l/m (liters per minute) sterile air.

After 48 hours, 900 mls of malic acid-free extract is removed from the fermentor and centrifuged to reclaim the microbial cells in the form of a cell pellet. To the 150 mls remaining in the fermentor is added 700 mls of sterile, insoluble solids-free GCE. Another 100 mls of the green extract is used to resuspend the centrifuged cell pellet, which is also added back to the fermentor.

Continuing in this manner, five malolactic fermentation cycles are completed. After the first cycle, which increases the cell mass about 10-fold, malic acid is totally metabolized within 24 hours in the following four cycles. The pH fluctuates between 4.5 and 5.1 and the maximum cell population attained is $3 \times 10^9$ CFU/ml.

EXAMPLE 5

100 mls of MRS nutrient medium, inoculated with *Lactobacillus plantarum*, is incubated 3 days at 30° C. and 200 rpm. Fifty mls each are then used as an inoculum of two 500 ml volumes of sterile GCE (25% solids). After one day's incubation at 30° C. and 100 rpm, the fermentations are combined and added to 4 liters of sterile GCE in a 7.5 L fermentor. This fermentation is controlled at 200 rpm, 30° C., and 12 l/m sterile air for 18 to 24 hours.

At the end of the fermentation, all but a couple hundred mls are removed, and the fermentor operations (except temperature) are temporarily stopped. An equal weight of green beans is added to extract, which is previously heated to 71° C. To this constant temperature water slurry is added water containing sucrose such that the final moisture level of the beans is about 48%. Sucrose is added at a 5% or 7.5% level based on the dry weight of the beans. With stirring, the beans are extracted for two or four hours.

After cooling, the green extract, which is maintained at about 25% solids, is added back to the fermentor for the initiation of a second fermentation cycle. In this manner a total of three fermentation cycles and four extraction cycles are completed. The final extraction cycle is conducted by splitting the malic acid-depleted extract from the first fermentation cycle in half and then contacting the beans with one half and then recontacting the same beans with the second half.

Adding 7.5% sucrose (dry basis) to one green bean extraction increases the bean sucrose level from 7.39 to 9.40% dry basis and decreases the malic acid content of the beans 58% from 0.36% to 0.15% dry basis.

EXAMPLE 6

Malic acid is metabolized in green coffee extract using immobilized *Lactobacillus plantarum* cells affixed to a PVC biosupport. Alternatively, a number of other bioreactor designs could be utilized, e.g. entrapped in k-carrageenan, affixed to sintered steel cylinders as well as other bioreactor designs known to those skilled in the art.

*Lactobacillus plantarum* is incubated in 200 mls of MRS nutrient medium for 3 days at 30° C. and 150 rpm. It is then halved and added to each of two 500 ml graduated cylinders containing 3000 mls MRS medium. Amerace biosupport material (FMC Corporation), configured in a cylindrical shape and supported by wire to the top of the graduated cylinder, is lowered into the cylinder. Both inoculated cylinders are placed on stir plates in an incubator set at 30° C. and gently stirred for 48 hours.

The biosupports, to which *Lactobacillus plantarum* cells attach themselves, are dipped quickly into sterile water to rinse away free cells and then submerged into two 500 ml graduated cylinders containing GCE spiked with malic acid to concentration of 2.85 g/L. After 48 hours, only traces of malic acid remain.

EXAMPLE 7

An immobilized cell bioreactor 40 is prepared by loading a cylindrical bioreactor support (FMC standard rib Amerace support) with $2.5 \times 10^{11}$ bacterial cells/in$^2$ of *Lactobacillus plantarum*. With reference to FIG. 2, two such cylindrical bioreactors 42, 44 are provided, each housed in s cylindrical casing. FIG. 2 is the same as FIG. 1, except the batch fermentor 21 is replaced by an immobilized cell bioreactor 40. The bioreactor consists of a ribbed sheet of silica gel embedded PVC having a rib height of 0.03 inches and rib spacing of 0.03 inches having total surface area of 6.2 square feet. The support in the bioreactor is spiral wound and is prepared by circulating through the support a broth of growing cells of *Lactobacillus plantarum* in MRS nutrient. Malic acid-containing, aqueous green coffee extract is fed to the bioreactor from vessel 18 and through sterilizing filters 20 such that it flows into the hollow core of the support, through the support, and out into the shell. The extract is passed through the bioreactor at an average flow rate of 15.6 ml/min. The green extract flows in a single pass through the support and into vessel 26.

Samples of the single pass exit stream are taken hourly for the first six hours. The bioreactor pump is then turned off, again turned on after twenty-two hours and finally turned off after twenty-five hours, providing a total run time of nine hours. Flow rates, temperature and backpressure are recorded during sampling. After sampling, the extract is centrifuged to separate any free cells. The pH of the extract is noted and the samples are frozen pending analysis.

Throughout the run, the flow rate ranges from 15.0 to 16.2 ml./min, backpressure ranges from 42.5 to 51.3 psi (no trend), and pH ranges from 4.99 to 5.8 (initial pH was 5.23). The temperature of the bioreactor remains at 80°–81° F. (FIG. 1). There are no significant trends associated with any of these values. The backpressure increases slightly (45.0 to 47.5 psi) from six to nine hours run time, but this may have been due to microbial cell buildup as the bioreactor sat idle overnight. There is a backpressure surge from two to four hours that remains unexplained.

Reliable malic acid values are obtained for the initial extract (0.087% (as is=0.512% db)) and after the first five hours (0.013, 0.013, 0.013, 0.012, and 0.013% (as is), respectively). This average malate concentration difference of 0.074% represents an 83.4% reduction in the exit stream after a single pass. At a flowrate of 15.6 ml/min (936 ml/hr), 0.69 grams of malic acid are catabolized per hour.

Because the exit stream pH only decreases to 5.0 from a feed stream pH of 5.23, it is apparent that less sugar was utilized and therefore less lactic acid is produced as it passes through the biosupport. On a dry basis, lactic acid increases 1.44-fold from 5.83% to 8.37% after nine hours run time and appears to level out after six hours. The acetic acid level increases during the run from 0.50 to 0.58% db. Citric acid decreases in the exit stream from 5.26 to 2.08% db after nine hours run time.

Glucose and fructose levels remain surprisingly high throughout the run. During this time, glucose levels range from 3.05 to 3.38% db (initial level is 3.42% db). Fructose levels range from 2.51 to 2.99% db (initial level is 3.04% db).

This example achieves an 83% malic acid reduction of the green extract stream during a short contact time. Lactic acid levels do not increase dramatically and appear to level off after six hours runtime. Glucose and fructose levels decrease only to a relatively small extent, and there is essentially no major loss of coffee solids.

What is claimed is:

1. A process for removing malic acid from a coffee product comprising subjecting a malic acid-containing aqueous coffee extract to malolactic fermentation, and recovering a malic acid-lean aqueous coffee extract having a reduced malic acid content.

2. A process according to claim 1 wherein the malic acid content of the aqueous coffee extract is reduced by at least 55%.

3. A process according to claim 1 wherein the malic acid content of the aqueous coffee extract is reduced by at least 80%.

4. A process according to claim 2 wherein the aqueous coffee extract is subjected to batch fermentation under the following conditions:

| | |
|---|---|
| pH | 3-5 |
| temperature | 16-37° C. |
| aeration | 0-50% dissolved oxygen |
| total solids | 5-30% by weight |
| fermentation time | 1-72 hours |
| malolactic bacteria concentration | $10^6$-$10^9$ CFU/ml. |

5. A process according to claim 2 wherein the aqueous coffee extract is subjected to batch fermentation under the following conditions:

| | |
|---|---|
| pH | 3.5-5.8 |
| temperature | 21-32° C. |
| aeration | 0-25% dissolved oxygen |
| total solids | 20-30% by weight |
| fermentation time | 2-36 hours |
| malolactic bacteria concentration | $10^8$-$10^9$ CFU/ml. |

6. A process according to claim 2 wherein the aqueous coffee extract is subjected to batch fermentation under the following conditions:

| | |
|---|---|
| pH | 4.5-5.2 |
| temperature | 28-30° C. |
| aeration | 15% dissolved oxygen |
| total solids | 25% by weight |
| fermentation time | 2-24 hours |
| malolactic bacteria concentration | $10^9$ CFU/ml. |

7. A process according to claim 1 wherein the aqueous coffee extract is subjected to continuous malolactic fermentation.

8. A process according to claim 7 wherein continuous malolactic fermentation is carried out under the following conditions:

| | |
|---|---|
| pH | 3-6 |
| temperature | 26-37° C. |
| aeration | 0-50% dissolved oxygen |
| total solids | 5-30% by weight |
| microorganism concentration | $10^9$-$10^{12}$ bacterial cells/in$^2$ |
| extract flow rate | 50-1000 ml/ft$^2$/hr. |

9. A process according to claim 7 wherein continuous malolactic fermentation is carried out under the following conditions:

| | |
|---|---|
| pH | 3.5-5.8 |
| temperature | 21-32° C. |
| aeration | 0-25% dissolved oxygen |
| total solids | 20-30% by weight |
| microorganism concentration | $10^{10}$-$5 \times 10^{11}$ bacterial cells/in$^2$ |
| extract flow rate | 75-600 ml/ft$^2$/hr. |

10. A process according to claim 7 wherein continuous malolactic fermentation is carried out under the following conditions:

| | |
|---|---|
| pH | 4.5-5.2 |
| temperature | 28-30° C. |
| aeration | 0-15% dissolved oxygen |
| total solids | 25% by weight |
| microorganism concentration | $10^{11}$-$5 \times 10^{11}$ bacterial cells/in$^2$ |
| extract flow rate | 200-400/ml/ft$^2$/hr. |

11. A process according to claim 4 wherein malolactic fermentation is effected in the presence of malolactic bacteria selected from the genera consisting of Streptococcus, Leuconostoc, Pediococcus, and Lactobacillus.

12. A process according to claim 11 wherein said malolactic bacteria comprises *L. oenos* or *Lactobacillus plantarum*.

13. A process according to claim 1 wherein said aqueous coffee extract comprises a green coffee extract.

14. A process according to claim 1 wherein said aqueous coffee extract comprises a brown coffee extract.

15. A process according to claim 1 further comprising the steps of
   (a) contacting malic acid-containing coffee solids with said malic acid-lean aqueous coffee extract to extract malic acid from the coffee solids to thereby form malic acid-depleted coffee solids and malic acid-containing aqueous coffee extract, and
   (b) separating the malic acid-containing aqueous coffee extract from the malic acid-depleted coffee solids to produce a coffee solids product having a reduced malic acid content.

16. A process according to claim 15 further comprising the steps of
   (c) subjecting the malic acid-containing coffee extract separated from the malic acid-depleted coffee solids in step (b) to malolactic fermentation, and
   (d) recovering a malic acid-lean aqueous coffee extract having a substantially reduced malic acid content.

17. A process according to claim 16 comprising carrying out step (a) using fresh coffee solids and using the malic acid-lean aqueous coffee extract recovered in step (d).

18. A process according to claim 15 wherein the malic acid content of the malic acid-containing coffee solids is reduced by more than 50%.

19. A process according to claim 15 wherein said malic acid-containing coffee solids comprise green coffee solids.

20. A process according to claim 19 wherein said green coffee solids comprises green coffee beans.

21. A process according to claim 15 wherein said malic acid-containing coffee solids comprise roasted coffee solids.

22. A process according to claim 21 wherein said roasted coffee solids comprise roasted and ground coffee.

* * * * *